(12) United States Patent
Ko et al.

(10) Patent No.: US 7,913,077 B2
(45) Date of Patent: Mar. 22, 2011

(54) PREVENTING IP SPOOFING AND FACILITATING PARSING OF PRIVATE DATA AREAS IN SYSTEM AREA NETWORK CONNECTION REQUESTS

(75) Inventors: Michael A. Ko, San Jose, CA (US); Renato J. Recio, Austin, TX (US); Jacobo A. Vargas, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 11/674,246

(22) Filed: Feb. 13, 2007

(65) Prior Publication Data
US 2008/0192750 A1    Aug. 14, 2008

(51) Int. Cl.
*H04L 29/06* (2006.01)
*G06F 7/04* (2006.01)
*G06F 15/16* (2006.01)

(52) U.S. Cl. ............................. 713/150; 726/2; 709/227

(58) Field of Classification Search ...... 726/2; 713/150; 709/227
See application file for complete search history.

(56) References Cited

U.S. PATENT DOCUMENTS

| | | | |
|---|---|---|---|
| 6,851,059 B1 | 2/2005 | Pfister et al. | |
| 6,990,528 B1 | 1/2006 | Neal et al. | |
| 7,133,929 B1 * | 11/2006 | Shah ............................ | 709/241 |
| 2002/0178339 A1 | 11/2002 | Beukema et al. | |
| 2002/0198927 A1 | 12/2002 | Craddock et al. | |
| 2003/0018787 A1 | 1/2003 | Neal et al. | |
| 2003/0031183 A1 | 2/2003 | Kashyap et al. | |
| 2003/0033426 A1 | 2/2003 | Beukema et al. | |
| 2003/0043805 A1 | 3/2003 | Graham et al. | |
| 2003/0050990 A1 | 3/2003 | Craddock et al. | |
| 2005/0144313 A1 | 6/2005 | Arndt et al. | |
| 2005/0223118 A1 | 10/2005 | Tucker et al. | |
| 2006/0013397 A1 | 1/2006 | Dorsch et al. | |
| 2006/0059328 A1 | 3/2006 | Toyohara et al. | |
| 2006/0117103 A1 * | 6/2006 | Brey et al. ..................... | 709/225 |
| 2006/0129676 A1 | 6/2006 | Modi et al. | |
| 2006/0129699 A1 | 6/2006 | Kagan et al. | |

OTHER PUBLICATIONS

Buonadonna et al., "Queue Pair IP: A Hybrid Architecture for System Area Networks", IEEE, Proceedings of the 29th Annual International Symposium on Computer Architecture (ISCA'02), 2002, 10 pages.

* cited by examiner

*Primary Examiner* — Michael Pyzocha
(74) *Attorney, Agent, or Firm* — Stephen J. Walder, Jr.; Matthew B. Talpis

(57) ABSTRACT

Mechanisms for preventing IP spoofing and facilitating parsing of private data areas in system and network connection requests are provided. With these mechanisms, an identifier, such as the high order bit of a Q_Key, is utilized to determine if a communication connection request originates with a privileged process. A second identifier is used to specify whether a private data area of a communication connection request utilizes predefined fields of a predefined structure or format. Only when the first identifier specifies that the request originates from a privileged process is the processing of the request permitted to be performed. Based on the setting of the second identifier, specific information is retrieved from the predefined fields of the private data area for use in establishing the requested communication connection.

20 Claims, 8 Drawing Sheets

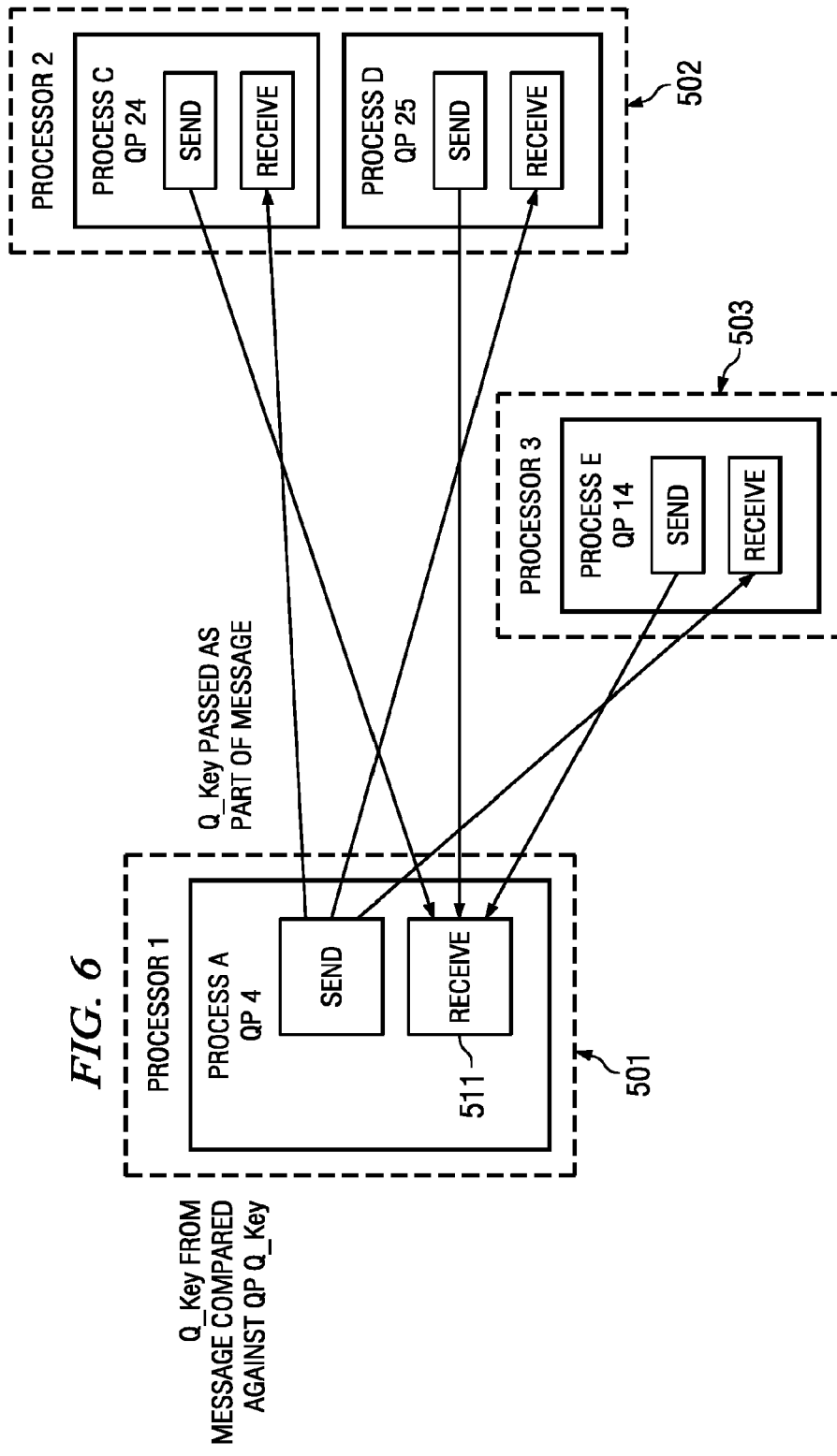

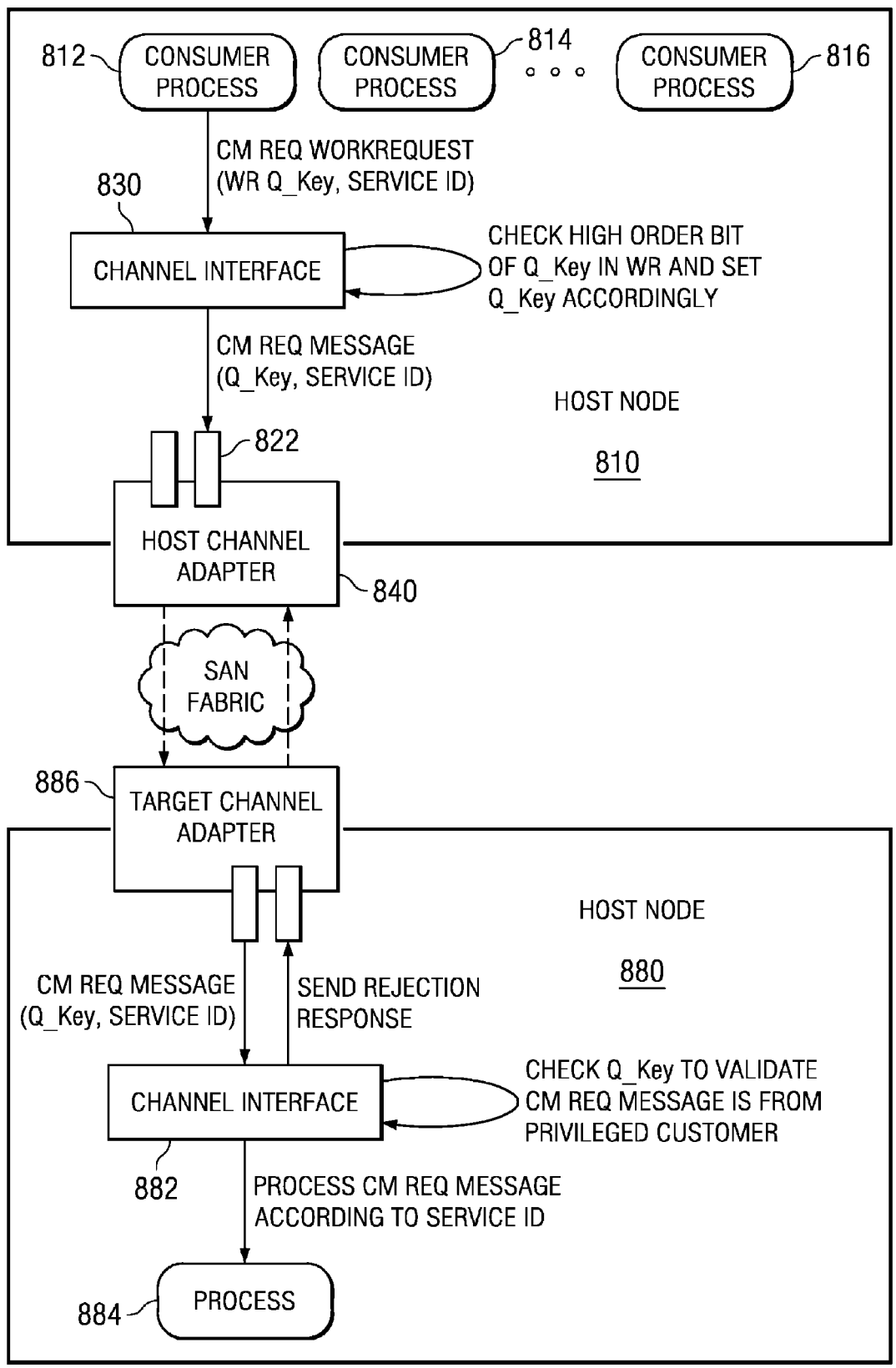

PREVENTING IP SPOOFING AND FACILITATING PARSING OF PRIVATE DATA AREAS IN SYSTEM AREA NETWORK CONNECTION REQUESTS

BACKGROUND

1. Technical Field

The present application relates generally to an improved data processing system and method. More specifically, the present application is directed to a system and method for preventing Internet Protocol (IP) spoofing and facilitating parsing of private data areas in system area network connection requests.

2. Description of Related Art

It is important in networking protocols that protections be provided for ensuring that only privileged or trusted applications are able to access certain resources. In other words, it is important that the networking protocol be able to rely on the fact that certain resources may be trusted to not be accessible by applications that may intentionally or unintentionally corrupt the operation of the network or data processing systems connected to the network.

For example, in a Transmission Control Protocol (TCP) network, such as the Internet, a non-privileged application is generally not capable of forging a source Internet Protocol (IP) address and is typically prevented form using certain source ports. Furthermore, a non-privileged client is not allowed to bind, i.e. establish a software link, to any address and is not allowed to send raw Ethernet packets, i.e. data packets that are not processed by the TCP/IP programming interface, to bypass the host stack. This is because raw sockets are not accessible by non-privileged applications. As a result, the TCP daemon process is able to assume as part of the IP connection setup that the remote IP address supplied is valid, unless a forger, i.e. a non-privileged application presenting an unauthentic IP address, has root access on the remote client.

In a system area network environment, such as an InfiniBand™ network architecture environment, TCP/IP communication is facilitated through a number of mechanisms described in the InfiniBand™ Architecture Specification Volumes 1 and 2, version 1.2, available from the InfiniBand™ Trade Association at www.infinibandta.org/specs/. It is assumed for purposes of the discussion of the present invention that one is familiar with the InfiniBand™ specification, which is readily available from the InfiniBand™ Trade Association, and thus, a detailed explanation of all of the mechanisms involved in TCP/IP communication over InfiniBand™ networks is not provided herein.

When an application requires IP addresses to be used during connection setup, such as for a TCP/IP connection over InfiniBand™ network environment, the IP addresses are usually communicated in the private data area of the Communication Management request (CM REQ) message. However, this does not implement the semantics of a TCP/IP connection establishment since the remote IP address presented to the listener that receives the CM REQ message cannot be assumed to be authentic. In other words, the same protection mechanisms used with TCP/IP networks that allow the TCP daemon to trust remote IP addresses supplied by remote clients are not present with regard to the private data area of CM REQ messages in the InfiniBand™ network. As a result, a forger may insert an unauthentic IP address in the private data area of a CM REQ message and thereby obtain unauthorized access to remote system resources. Thus, there is no way to know that a user mode application simply has not made up an IP address and submitted it as part of normal CM REQ private data. This is because, in the InfiniBand™ network, a user space consumer may supply any data it wants to be used as CM private data. Thus, it is possible that the user space consumer may potentially exploit this to perform IP spoofing. That is, a user space consumer may place an unauthorized IP address in the private data area and thereby be able to establish a communication connection and access remote resources to which the user space consumer should not have access.

SUMMARY

The illustrative embodiments provide a mechanism to eliminate the ability for a user space consumer to perform Internet Protocol (IP) spoofing by supplying an unauthorized IP address in the private data area of a Communications Management request (CM REQ) message in an InfiniBand™ network. Moreover, the illustrative embodiments provide a protocol by which the data provided in the private data area of a CM REQ message may be read and interpreted for use in TCP/IP connection establishment and communication.

With the mechanisms of the illustrative embodiments, the CM REQ is restricted to privileged consumers only. This may be verified by a passive side of the connection establishment transaction by examining a Q_Key that is provided in the CM REQ. With the mechanisms of the illustrative embodiments, only controlled Q_Keys, indicating that the CM REQ comes from a privileged consumer, are permitted to establish communication connections for TCP/IP communication. In one illustrative embodiment, the ensuring that only privileged consumers may handle the connection establishment via CM REQ messages is made possible through the use of Q_Keys with the high order bits of these Q_Keys specifying whether or not the originator of the CM REQ message is a privileged application. If the high order bit of the Q_Key is set, then the Q_Key is associated with a privileged queue pair associated with a privileged application. By checking for this high order bit of the Q_Key, the passive side of the connection establishment may be able to determine whether an IP address supplied in a CM REQ message is authentic and may be trusted. This eliminates the possibility that a user space consumer may supply anything to be used as private data in a CM REQ.

Moreover, as a further feature of the illustrative embodiments, to restrict the type of information which may be passed in the CM REQ private data fields in a system area network (SAN) environment, such as an InfiniBand™ network, a new service identifier (ID) is used. The use of this new service ID informs the InfiniBand™ fabric, i.e. switches, channel adapters, etc., that the CM REQ private data field is to be interpreted in a defined manner. Thus, for example, IP addresses and other critical information for connection establishment have their own defined fields in the CM REQ private data area. As a result, a passive side of the connection establishment transaction knows where in the private data area of the CM REQ to obtain the information that is necessary for establishing a TCP/IP connection between the active and passive sides.

In one illustrative embodiment, a method is provided for processing a communication connection request. The method may comprise determining if a communication connection request has a first identifier indicating that the communication connection request originates with a privileged process and, if the communication connection request originates with a privileged process, determining if the communication connection request has a second identifier specifying that a private data area of the communication connection request utilizes predefined fields in a predefined format. The method may further comprise processing information in the private data area of the communication connection request in accordance with the predefined fields of the predefined format. Moreover, the method may comprise establishing a communication connection using the processed information in the private data area of the communication connection request.

The communication connection request may be a communication management request message having a private data area and a header in which the first and second identifiers are provided. The first identifier may be a Q_Key. The second identifier may be a service identifier in a communication management request message. The first identifier may be set to a first value if the communication connection request originates with a privileged process and may be set to a second value if the communication connection request originates with a non-privileged process. Only an operating system or a privileged process may set the first identifier to the first value.

The data processing system may be a host node in a system area network. The method may be implemented in a channel adapter of the host node. The information in the private data area may comprise at least one of a source Internet Protocol (IP) address or a destination IP address in predefined fields of the private data area. The communication connection request may comprise one or more unreliable datagram packets passed from another data processing system using a remote direct memory access (RDMA) operation.

The determining steps, processing step, and establishing step may be performed in a first host node of the data processing system. The method may further comprise receiving, in a second host node of the data processing system, the communication connection request from a process running in the remote host node and determining, in the second host node, whether the process is a privileged process. The method may also comprise modifying, in the second host node, the communication connection request to set the first identifier to a value corresponding to a value of the first identifier associated with a queue pair for the process if the process is not a privileged process. Moreover, the method may comprise sending the communication connection request from the second host node to the first host node. If the first identifier is set to indicate that the communication connection request originates with a privileged process, then the first identifier may be set to a value corresponding to a value of the first identifier provided in the communication connection request sent by the process and received in the second host node.

Determining if a communication connection request has a first identifier indicating that the communication connection request originates with a privileged process may comprises determining if the communication connection request targets a queue pair associated with an operating system of the data processing system, determining if the first identifier corresponds to the queue pair associated with the operating system, and rejecting the communication connection request if the first identifier does not match an identifier for the queue pair associated with the operating system. Determining if a communication connection request has a first identifier indicating that the communication connection request originates with a privileged process may further comprise determining if the first identifier has a high order bit set if the communication connection request does not target a queue pair associated with the operating system, determining if the first identifier matches an identifier of a queue pair targeted by the communication connection request, if the first identifier has a high order bit set, and rejecting the communication connection request if either the first identifier does not have the high order bit set or the first identifier does not match an identifier of a queue pair targeted by the communication connection request.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 is an exemplary diagram illustrating a three processor datagram communication service in accordance with one illustrative embodiment;

FIG. 7 is an exemplary diagram illustrating a Q_Key with a control bit for indicating whether the Q_Key is associated with a privileged application;

FIG. 8 is an exemplary block diagram for processing a CM REQ message in accordance with one illustrative embodiment;

DETAILED DESCRIPTION OF THE ILLUSTRATIVE EMBODIMENTS

The illustrative embodiments herein provide mechanisms for ensuring that a source of a connection establishment request in a system area network is a privileged source and for restricting the type of information that may be provided in a connection establishment request used in the system area network. The ensuring that such a request is from a privileged source involves providing an identifier in a header of the request that identifies whether the request originates with a privileged source or not. This identifier is only accessible by privileged applications such that non-privileged applications cannot modify the setting of this identifier. In this way, only privileged applications may identify themselves as privileged and be able to establish communication connections. As a result, address information and other information in the request may be trusted by recipients of the connection establishment request.

In one illustrative embodiment, this system area network is an InfiniBand™ network that provides an Internet Protocol (IP) over InfiniBand™ (IPoIB) functionality. In such a system, CM REQ messages are used to establish communication connections between consumers via queue pairs. In such an embodiment, the identifier may be provided as a bit, such as the high order bit, in a Q_Key provided as part of the CM REQ message. When this Q_Key is set, the receiver of the CM REQ message may trust that the CM REQ message originated with a privileged consumer and thus, may trust information provided in a private data area of the CM REQ message.

While the illustrative embodiments will be described in terms of a system area network (SAN) with specific reference to exemplary embodiments in which the SAN is an InfiniBand™ network, these embodiments are only illustrative and are not to be limiting to the types of networks in which the mechanisms of the illustrative embodiments may be implemented. For purposes of the description of the illustrative embodiments, it is assumed that those of ordinary skill in the art are familiar with the InfiniBand™ Architecture Specification generally available from the InfiniBand™ Trade Association (IBTA). Thus, a detailed discussion of the InfiniBand™ Architecture Specification is not provided herein.

Figure 1:
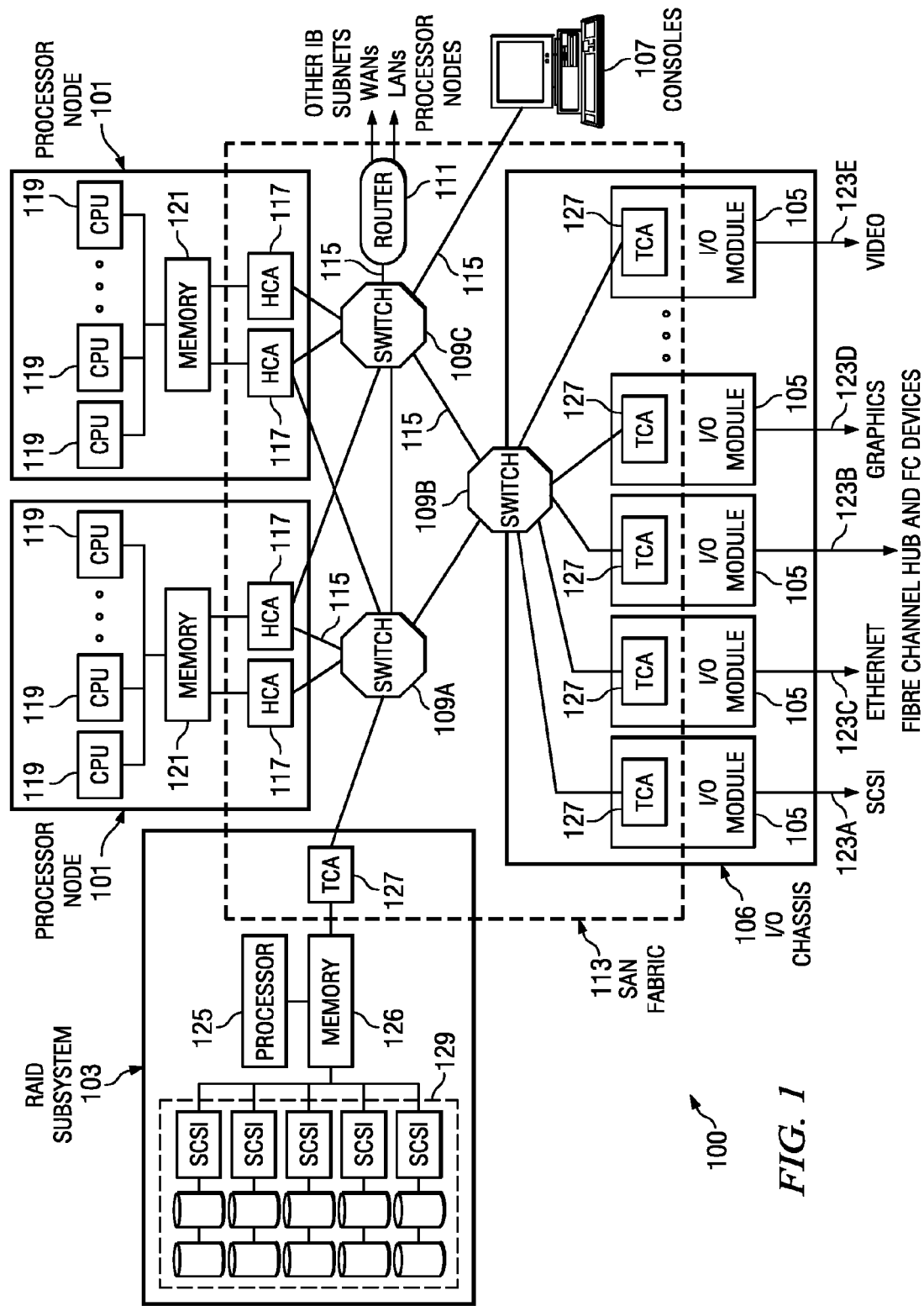
FIG. 1 is an exemplary diagram of a distributed computer system in which exemplary aspects of the illustrative embodiments may be implemented.

With reference now to the figures and in particular with reference to FIG. 1, there is illustrated an exemplary embodiment of a distributed computer system in which exemplary aspects of the illustrative embodiments may be implemented. The distributed computer system 100 represented in FIG. 1 is provided merely for illustrative purposes, and the illustrative embodiments described below may be implemented on computer systems of numerous other types and configurations. For example, computer systems implementing the illustrative embodiments may range from a small server with one processor and a few input/output (I/O) adapters to very large parallel supercomputer systems with hundreds or thousands of processors and thousands of I/O adapters. Furthermore, the illustrative embodiments may be implemented in an infrastructure of remote computer systems connected by an Internet or intranet.

As shown in FIG. 1, distributed computer system 100 includes a system area network (SAN) 113, which is a high-bandwidth, low-latency network interconnecting nodes within the distributed computer system. More than one SAN 113 may be included in a distributed computer system 100 and each SAN 113 may comprise multiple sub-networks (subnets).

A node is herein defined to be any component that is attached to one or more links of a network. In the illustrated distributed computer system, nodes include host processors 101, redundant array of independent disks (RAID) subsystem 103, I/O adapters 105, switches 109A-109C, router 111, and the like. The nodes illustrated in FIG. 1 are for illustrative purposes only, as SAN 113 may connect any number and any type of independent nodes. Any one of the nodes may function as an end node, which is herein defined to be a device that originates or finally consumes messages or frames in the distributed computer system 100.

The SAN 113 is the communications and management infrastructure supporting both I/O and inter-processor communications (IPC) within distributed computer system 100. The distributed computer system 100, as illustrated in FIG. 1, includes a switched communications fabric (i.e., links, switches and routers) allowing many devices to concurrently transfer data with high-bandwidth and low latency in a secure, remotely managed environment. The end nodes may communicate over multiple ports and utilize multiple paths through the SAN 113. The availability of multiple ports and paths through the SAN 113 may be employed for fault tolerance and increased-bandwidth data transfers.

The SAN 113 includes switches 109A-109C and routers 111. The switches 109A-109C connect multiple links together and allow routing of packets from one link to another link within the SAN 113 using a small header Destination Local Identifier (DLID) field. The router 111 is capable of routing frames from one link in a first subnet to another link in a second subnet using a large header Destination Globally Unique Identifier (DGUID). The router 111 may be coupled via wide area network (WAN), local area network (LAN), or the like, connections to other hosts and/or other routers.

In the SAN 113, the host processor nodes 101 and I/O nodes 106 include at least one Channel Adapter (CA) to interface with the SAN 113. The host processor nodes 101 include central processing units (CPUs) 119 and memory 121. In one embodiment, each CA is an endpoint that implements a CA interface, such as provided in the InfiniBand™ Architecture Specification referenced above, in sufficient detail to source or sink packets transmitted on the SAN 113. As illustrated, there are two CA types, a Host CA (HCA) 117 and a Target CA (TCA) 127. The HCA 117 is used by general purpose computing nodes to access the SAN 113. In one implementation, the HCA 117 is implemented in hardware. In the hardware implementation of the HCA 117, the HCA hardware offloads much of CPU and I/O adapter communication overhead. The hardware implementation of the HCA 117 also permits multiple concurrent communications over a switched network without the traditional overhead associated with communicating protocols. Use of the HCAs 117 in the SAN 113 also provides the input/output (I/O) and inter-processor communication (IPC) consumers of distributed computer system 100 with zero processor-copy data transfers without involving the operating system kernel process. The HCA 117 and other hardware of the SAN 113 provide reliable, fault tolerant communications.

The I/O chassis 106 includes I/O adapter backplane and multiple I/O adapter nodes 105 that contain adapter cards. Exemplary adapter cards illustrated in FIG. 1 include a SCSI adapter card 123A, an adapter card 123B to fiber channel hub and FC-AL devices, an Ethernet adapter card 123C, a graphics adapter card 123D, and a video adapter card 123E. Any known type of adapter card may be implemented with the mechanisms shown in FIG. 1 without departing from the spirit and scope of the present invention. The I/O chassis 106 also includes a switch 109B in the I/O adapter backplane to couple the adapter cards 123A-123E to the SAN 113.

The RAID subsystem 103 includes a microprocessor 125, a memory 126, a Target Channel Adapter (TCA) 127, and multiple redundant and/or striped storage disks 129.

In the illustrated SAN 113, each link 115 is a full duplex channel between any two network elements, such as end nodes, switches 109A-109C, or routers 111. Suitable links 115 may include, but are not limited to, copper cables, optical cables, and printed circuit copper traces on backplanes and printed circuit boards. The combination of links 115 and switches 109A-109C, etc. operate to provide point-to-point communication between nodes of the SAN 113.

Figure 2:
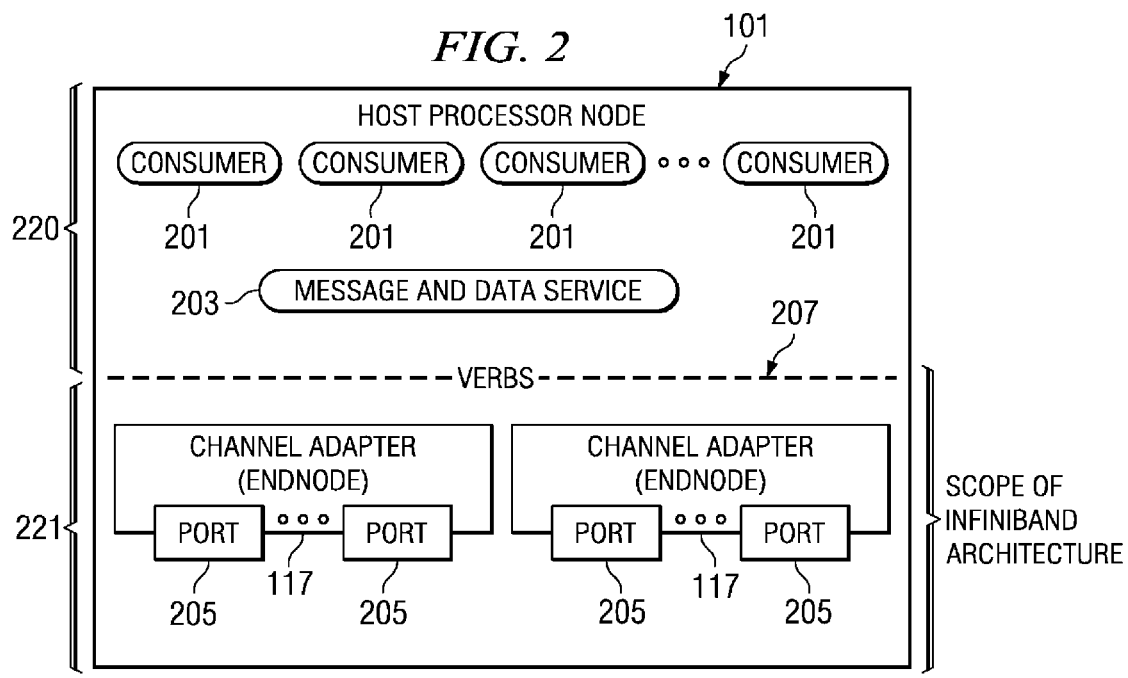
FIG. 2 is an exemplary diagram illustrating exemplary software and hardware aspects of a host processor node in accordance with one illustrative embodiment.

Software and hardware aspects of an exemplary host processor node 101 are generally illustrated in FIG. 2. The host processor node 101 includes one or more processors that execute a set of consumer processes 201. The host processor node 101 includes a HCA 117 with ports 205. Each port 205 connects to a link 115 of the SAN 113. The ports 205 may connect to one SAN subnet or multiple SAN subnets. Utilizing message and data services 203, consumer processes 201 transfer messages to the SAN 113 via a verbs interface 207. The verbs interface 207 is generally implemented with an operating-system specific programming interface. With an InfiniBand™ implementation of the SAN 113, the verbs interface 207 is specified in the InfiniBand™ Architecture Specification referenced previously.

Figure 3:
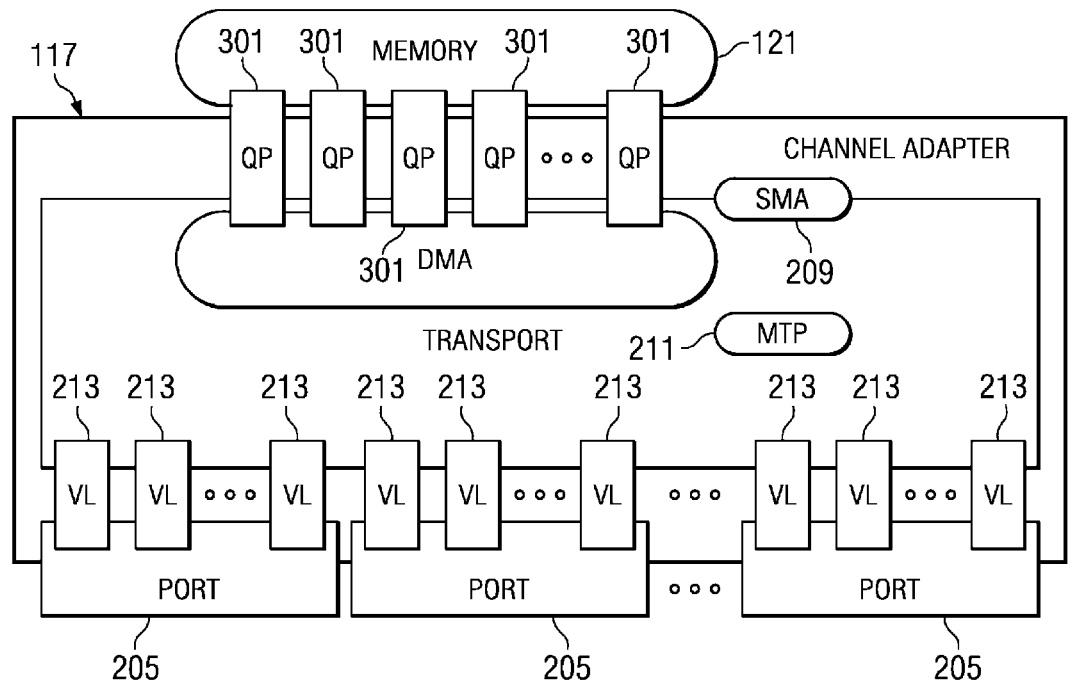
FIG. 3 is an exemplary diagram of a software model of a host channel adapter in accordance with one illustrative embodiment.

A software model of the HCA 117 is illustrated in FIG. 3. The HCA 117 includes a set of queue pairs (QPs) 301 which transfer messages across ports 205 to a subnet. A single HCA 117 may support thousands of QPs 301. By contrast, the TCA 127 in an I/O adapter typically supports a much smaller number of QPs 301. Also illustrated are a subnet management administration (SMA) module 209, management packets 211, and a number of virtual lanes 213, which connect a transport layer with the ports 205.

Figure 4:
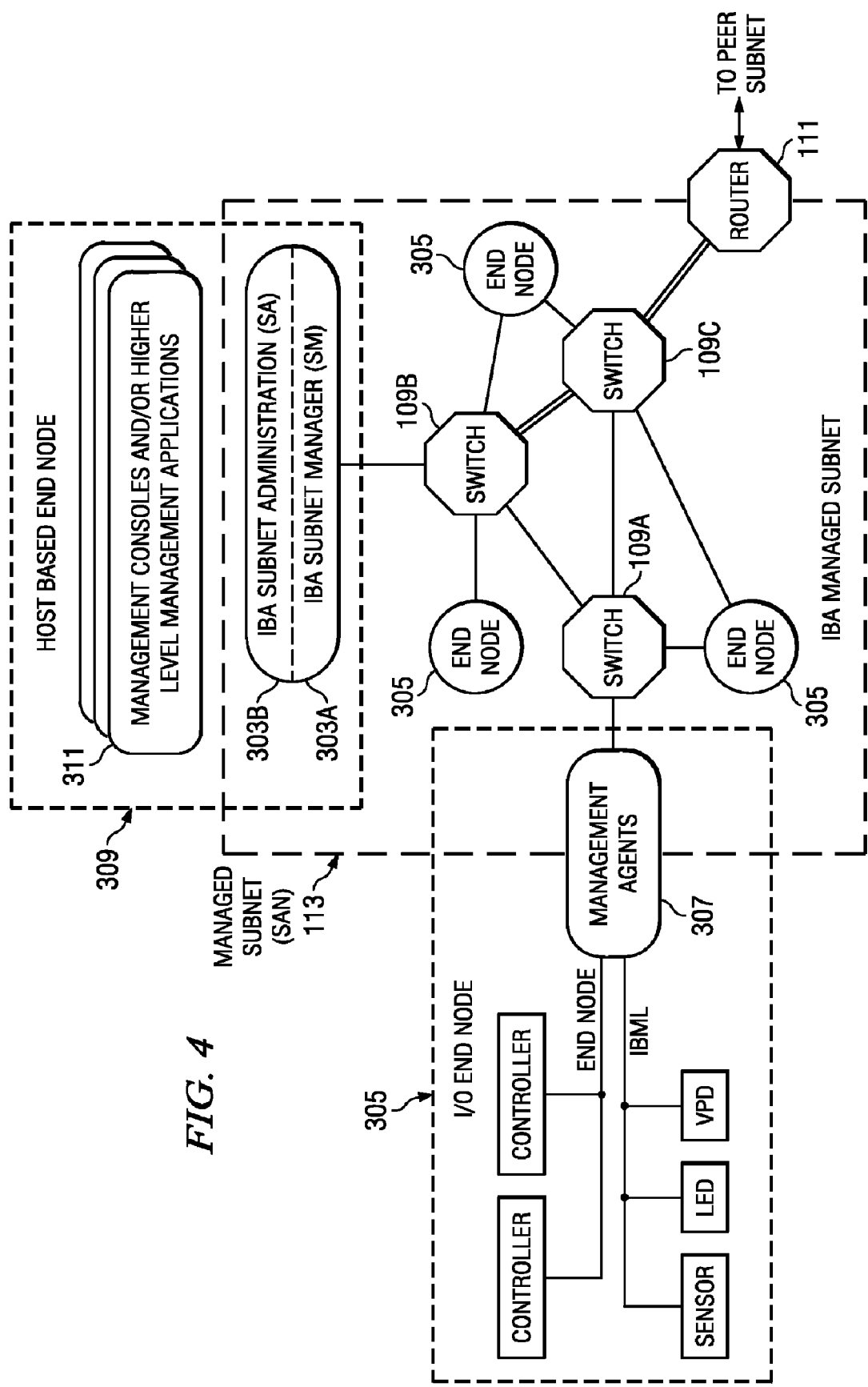
FIG. 4 is an exemplary diagram illustrating a software management model for nodes on a SAN in accordance with one illustrative embodiment.

Turning now to FIG. 4, there is illustrated a software management model for nodes on the SAN 113. The SAN architecture management facilities provide a Subnet Manager (SM) 303A, a Subnet Administration (SA) module 303B, and an infrastructure that supports a number of general management services. The management infrastructure includes a Subnet Management Agent (SMA) 307 operating in each node. The management infrastructure defines a general service interface that allows additional general services agents. Also, the SAN architecture defines a common management datagram (MAD) message structure for communicating between managers and management agents.

The SM 303A is responsible for initializing, configuring and managing switches, routers, and channel adapters. The SM 303A may be implemented within other devices, such as a channel adapter or a switch. One SM 303A of the SAN 113 is dedicated as a master SM and is responsible for discovering the subnet topology, configuring each channel adapter port with a range of Local Identification (LID) numbers, Global Identification (GID) number, subnet prefix, and Partition Keys (P_Keys); configuring each switch with a LID, the subnet prefix, and with its forwarding database, and maintaining the end node and service databases for the subnet to provide a Global Unique Identification (GUID) number to LID/GID resolution service as well as a services directory. Thus, management of the SAN 113 and SAN components, such as the HCAs 117, the TCAs (or end nodes) 127, the switches 109A-109C, and the routers 111 are completed utilizing Subnet Management (SM) 303A and Subnet Administration (SA) module 303B. Subnet Management Packets (SMPs) are used to discover, initialize, configure, and maintain the SAN components through the management agents 307 of the end nodes 305. The SAN SA packets are used by SAN components to query and update subnet management data. Control of some aspects of the subnet management is provided via a user management console 311 in host-based end node 309.

The SAN 113 provides the high-bandwidth and scalability required for I/O and also supports the extremely low latency and low CPU overhead required for Inter-processor Communications (IPC). User processes may bypass the operating system (OS) kernel process and directly access network communication hardware, such as HCAs 117, which enables efficient message passing protocols. The SAN 113 is suited to current computing models and is a building block for new forms of I/O and computer cluster communication. The SAN 113 allows I/O adapter nodes 105 to communicate among themselves or communicate with any or all of the processor nodes 101 in the distributed computer system. With an I/O adapter attached to the SAN 113, the resulting I/O adapter node 105 has substantially the same communication capability as any processor node 101 in the distributed computer system.

For reliable service types of messages, end nodes, such as the host processor nodes 101 and I/O adapter nodes 105, generate request packets and receive acknowledgment packets. The switches 109A-109C and routers 111 pass packets along from the source to the target (or destination). Except for the variant CRC trailer field, which is updated at each transfer stage in the network, the switches 109A-109C pass the packets along unmodified. The routers 111 update the variant CRC trailer field and modify other fields in the header as the packet is routed.

In the SAN 113, the hardware provides a message passing mechanism that may be used for Input/Output (I/O) devices and inter-processor communications (IPC) between general computing nodes. Consumers access the SAN 113 message passing hardware by posting send/receive messages to send/receive work queues (WQ), respectively, on a SAN Channel Adapter (CA).

A message is herein defined to be an application-defined unit of data exchange, which is a primitive unit of communication between cooperating processes. A packet (or frame) is herein defined to be one unit of data encapsulated by networking protocol headers (and trailer). The headers generally provide control and routing information for directing the packet (or frame) through SAN 113. The trailer generally contains control and cyclic redundancy check (CRC) data for ensuring that frames are not delivered with corrupted content.

Consumers use SAN verbs to access HCA functions. The software that interprets verbs and directly accesses the CA is known as the Channel Interface (CI). Send/Receive work queues (WQ) are assigned to a consumer as a Queue Pair (QP). Messages may be sent over five different transport types, Reliable Connected (RC), Reliable Datagram (RD), Unreliable Connected (UC), Unreliable Datagram (UD), and Raw Datagram (RawD). Consumers retrieve the results of these messages from a Completion Queue (CQ) through SAN send and receive work completions (WC). The source CA takes care of segmenting outbound messages and sending them to the destination. The destination or target CA takes care of reassembling inbound messages and placing them in the memory space designated by the destination's consumer. These features are illustrated in the figures below.

Figure 5:
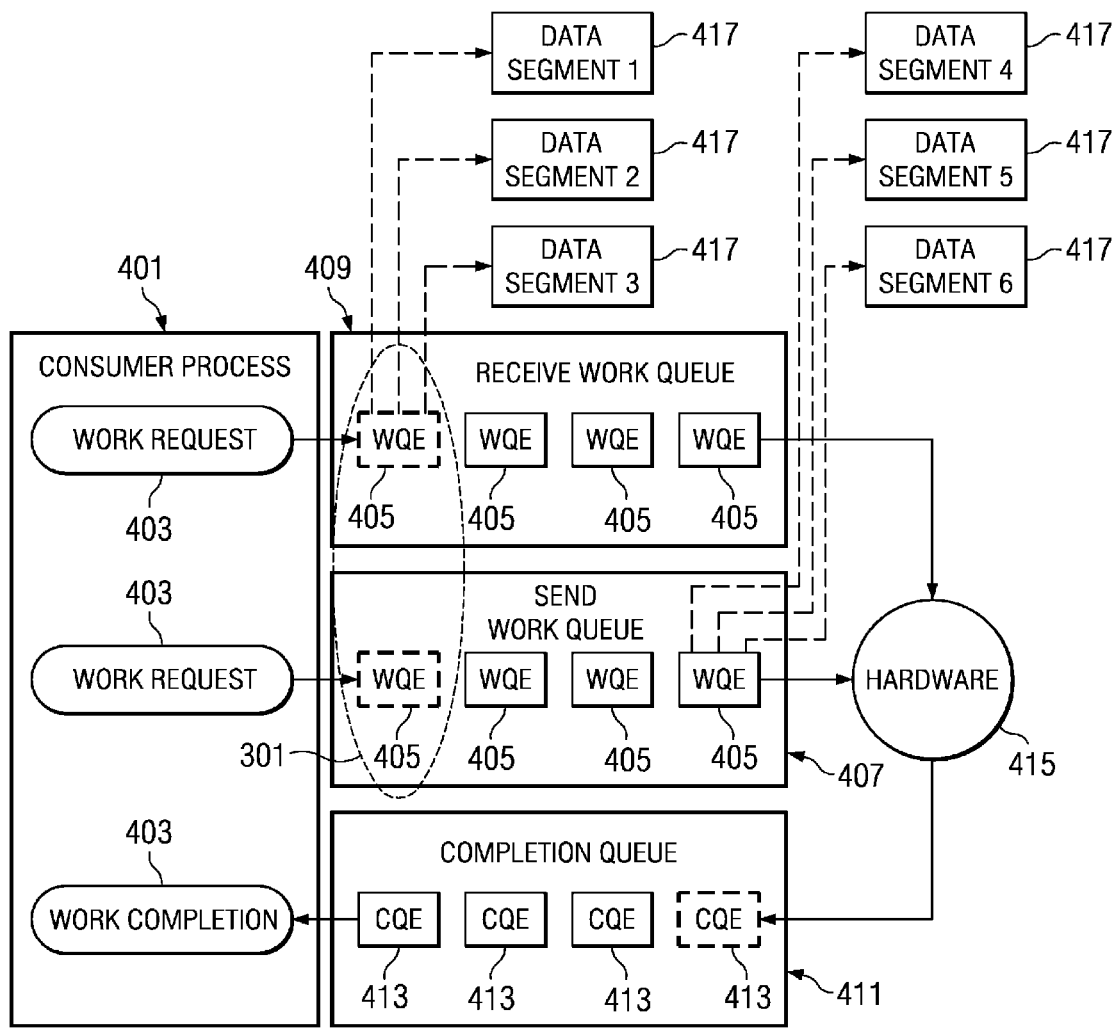
FIG. 5 is an exemplary block diagram illustrating work and completion queue processing in accordance with one illustrative embodiment.

Referring now to FIG. 5, there is illustrated a block diagram of work and completion queue processing. Each QP 301 provides an input to a Send Work Queue (SWQ) 407 and a Receive Work Queue (RWQ) 409. The SWQ 407 sends channel and memory semantic messages, and the RWQ 409 receives channel semantic messages. A consumer calls a verb (within verbs interface 207) to place Work Requests (WRs) into a work queue (WQ). A Send WR 403 is a channel semantic operation to push a set of local data segments 417 to the data segments referenced by a remote node's Receive WQE 405. Each of the Send WR's data segments 417 contains a virtually contiguous memory region. The virtual addresses used to reference the local data segments 417 are in the address context of the process that created the local QP 301.

As shown in FIG. 5, WRs 403 that have been placed onto a WQ by a consumer process 401 are referred to as work queue elements (WQEs) 405. WQEs 405 are executed by hardware 415 in HCA 117. The SWQ 407 contains WQEs 405 that describe data to be transmitted on the SAN fabric. The RWQ 409 contains WQEs 405 that describe where to place incoming channel semantic data received from SAN 113.

In one embodiment, The RWQs 409 only support one type of WQE 405, which is referred to as a Receive WQE. The Receive WQE provides a channel semantic operation describing a local memory space into which incoming send messages are written. The Receive WQE includes a scatter list describing several virtually contiguous memory spaces. An incoming send message is written to these memory spaces. The virtual addresses are in the address contexts of the process that created the local QP 301.

The verbs interface 207 also provides a mechanism for retrieving completed work from completion queue 411. The completion queue 411 contains Completion Queue Elements (CQEs) 413 which contain information about previously completed WQEs 405. The completion queue 411 is employed to create a single point of completion notification for multiple QPs 301. A CQE 413 contains sufficient information to determine the QP 301 and specific WQE 405 that completed. A completion queue context (not shown) is a block of information that contains pointers to, length, and other information needed to manage individual completion queues 411.

Queues that are shared among processes using datagram type messages across the SAN fabric require protection keys to validate the requester's right to use the received queue at the receiving end. One of the protection keys utilized within the SAN 113 is called the Queue Key (Q_Key). The Q_key mechanism allows applications to authenticate their right to utilize particular communication resources, such as send and receive queues. In order to facilitate the authentication by the applications (i.e., use of the received queue), the Q_keys are typically able to be set by the application. Because of the ability of the application to set the Q_key, there is a need for stronger authentication that cannot be forged by an application not authorized to access the communication resources.

In SAN 113, the OS runs as a privileged class program, and applications run as an unprivileged class. The applications request the OS to perform certain operations that are privileged, for example the QP context setup. A Q_key, that is OS controllable and which prevents access to a queue resource from an application process level without validation that the application has authority to use the queue resource, is provided. Unauthorized access is controlled by utilizing keys that are large enough to make guessing of the correct key by the application process very difficult. "Controlled Q_keys" are generated for the queues but cannot be manipulated from the application process level unless the operating system (OS) gives the application the authority to do so.

Referring now to FIG. 6, a three processor datagram communication service is illustrated. The three processors, processors 501, processors 502 and processors 503 communicate with each other via Send/Receive (QP) messages of various processes. Four such processes are illustrated including, for example, Process C and Process D on processor 502 and Process E on processor 503. During operation, the remote processes may simultaneously attempt to communicate with Process A through the use of datagram type messages. Datagram type messages comprise a characteristic that allows sharing of QPs at the end nodes.

As illustrated in FIG. 6, Processes C, D, and E are attempting to communicate with QP_4 of process A. Each datagram message contains a Q_Key as part of the message. The Q_key is compared against the Q_Key that is associated with QP_4. If there is a match, the request is placed into the Receive Queue 511 of QP_4, otherwise it is either silently dropped (e.g., as in the case of Unreliable Datagram type service) or a negative acknowledgment (NAK) type message is sent back to the sender (e.g., as in the case of Reliable Datagram type service). Typically, application processes requesting access to a QP may guess at the Q_key a number of times until the correct Q_key is guessed. To prevent one or more of Processes C, D, or E from gaining unauthorized access to QP_4, a Q_key is needed that cannot be guessed by the excluded processes. Possible successful attempts by one or more of the processes C, D, or E of guessing the Q_Key correctly are prevented by providing a Q_key that cannot be generated by the requesting process.

An additional bit is provided in the Q_key and designated a privilege bit (or control bit). The additional bit enhances the Q_key functionality by allowing application level access restrictions to be set for the Q_key. FIG. 7 illustrates a Q_key 701 (e.g. a sequence of characters) with control bit 703. Thus, during SAN operation, application level code is prohibited from generating a Q_key on a Send Work Request or a Modify QP request unless the HCA code, which is trusted, first identifies the application as having authority to use a controlled Q_Key.

In the preferred embodiment, a controlled Q_Key is a Q_Key with an additional bit or dedicated highest order bit that is reserved for the OS (i.e., the value may be changed only by the OS). Accordingly, two classes of Q_Keys are created, the controlled class and the uncontrolled class. The control bit is set to 1 for the controlled class, and to 0 for the uncontrolled class. Only the OS, and consumer processes given privilege by the OS, are permitted to submit a Q_Key in a work request (WR) that is a controlled Q_Key. Other user space consumers may only submit WRs with Q_Keys having the high order bit not set. This prevents a user space consumer from sending a message to a privileged mode QP because the passive side will check the high order bit (which cannot be tampered with by the user space consumer) and only successfully process messages that have that bit set.

The mechanisms of the illustrative embodiments utilize the controlled Q_Keys to verify that connection requests originate from authorized or privileged consumers. In this way, Internet Protocol (IP) communication over a SAN is made possible while maintaining a security level similar to that of TCP. This security level assures the passive side of the connection establishment that it may trust the sender of the connection request.

Taking InfiniBand™ as an exemplary SAN in which the mechanisms of the illustrative embodiments are implemented, communication management (CM) messages are passed by the InfiniBand™ fabric using unreliable datagram (UD) queue pairs (QPs). Such CM messages, i.e. UD packets, are passed using remote direct memory access (RDMA) operations in which data is communicated directly from one memory to another without involving the processor of the host node. A Datagram Extended Transport Header (DETH) is used in a UD packet. The DETH contains, among other things, the destination Q_Key of the queue pair to which the UD packet is directed. This Q_Key has a high order bit that may be set to specify whether or not the originator of the UD packet is privileged or not.

For example, when a consumer generates a work request (WR), the consumer specifies a Q_Key that is included in the WR. If the consumer is a privileged consumer, then the high order bit of the Q_Key in the WR is set by the consumer. Consumers that are not privileged consumers are not able to set the high order bit of the Q_Key. Thus, the Q_Key associated with non-privileged consumers is not set and indicates that the source of the WR is a non-privileged consumer.

The channel interface (CI) examines this Q_Key in the WR and, based on the setting of the high order bit, determines whether the DETH of the outgoing packet contains the Q_Key from the QP associated with the consumer, or the Q_Key from the work request (WR). Again, Q_Keys with the most significant bit set are considered controlled Q_Keys and a channel adapter does not allow a consumer to arbitrarily specify a controlled Q_Key. The OS maintains control of the controlled Q_Keys since it may configure the QP context for the controlled Q_Key for privileged consumers only. This allows privileged mode code to implement the policy that user space consumers are only offered Q_Keys that have the high order bit not set.

Thus, for a CM REQ message, for example, the high order bit of the Q_Key in the DETH of the CM REQ, in accordance with the mechanisms of the illustrative embodiment, informs a channel interface (CI), whose job it is to interpret the verbs used in communication via the channel adapters, whether or not the CM REQ message originated from a privileged consumer. With the illustrative embodiments, only privileged consumers, i.e. the OS of a host node or applications to which the OS has given privileged status, may establish communications connections using a CM REQ message. If the high order bit of the Q_Key indicates that a privileged consumer was the source of the CM REQ message, then the passive side of the communication connection may trust the information provided in the private data area of the CM REQ message. If the high order bit of the Q_Key indicates that a non-privileged consumer was the source of the CM REQ message, then the passive side may not trust the information provided in the private data area, i.e. the information may be user space application generated and thus, may be spoofed information. As a result, the CM REQ message may be rejected.

FIG. 8 is an exemplary block diagram for processing a CM REQ message in accordance with one illustrative embodiment. As shown in FIG. 8, a host node 810 includes a plurality of consumer processes 812-816 running on it. A consumer process 812 wishes to establish a TCP/IP communication connection with a process 884 on host node 880. As a result, the consumer process 812 posts a CM REQ work request to its send queue in the local QP 822 associated with host channel adapter 840 via the channel interface 830. As part of this CM REQ work request, the consumer process 812 provides a Q_Key, and sets the high order bit of the Q_Key of the CM REQ work request. In addition, the consumer process 812 qualifies the CM REQ work request with a new service identifier which has a formatted private data area, as will be discussed in greater detail hereafter.

The CM REQ work request is received from the consumer process 812 in the channel interface 830. The channel interface 830 examines the CM REQ work request and determines if the Q_Key provided in the CM REQ work request indicates that the CM REQ work request originated from a privileged consumer, such as an OS or a process which has been granted privileged status by the OS. For example, the channel interface 830 may check the status of the high order bit in the Q_Key to determine if the high order bit is set or not. If the high order bit is set, then the channel interface 830 may determine that the consumer process 812 is a privileged consumer process. If the high order bit is not set, then the channel interface 830 may determine that the consumer process 812 is a non-privileged consumer process.

Since the OS controls who can use privileged Q_Keys, the only time that the high order bit in the Q_Key can be set is when the consumer process 812 is a privileged consumer process and specifically sets the high order bit in the Q_Key. Otherwise, the high order bit will not be set, which is the default for non-privileged consumer processes.

If the high order bit of the Q_Key in the work request is not set, the channel interface 830 instructs the local QP 822 of the host channel adapter 840 to embed the Q_Key supplied in the CM REQ work request in the DETH of the CM REQ message that is sent out by the local QP 822. If the high order bit of the Q_Key in the CM REQ work request is set, the channel interface 830 instructs the local QP 822 to embed its own Q_Key instead.

Using these mechanisms, the Q_Key itself cannot be spoofed by virtue of the architecture. That is, since the OS controls QP creation and user level applications cannot alter the QP context, the OS has the means to control use of privileged Q_Keys. If a non-privileged user level application sets the high order bit of the Q_Key in the work request, then the local QP will embed its own Q_Key instead of the one supplied with the work request. For a non-privileged user level application, the Q_Key in the QP context is a non-privileged Q_Key.

When the target host node 880 receives the CM REQ message, it uses the Q_Key in the DETH of the CM REQ message to validate the incoming CM REQ message. The channel interface 882 of the target host node 880 examines the Q_Key and determines if the queue pair that is the target of the CM REQ message is queue pair 1 (QP1). QP1 is a special queue pair in the InfiniBand™ architecture that is assigned to the OS and thus, handles privileged or trusted communications. If the CM REQ message is directed to QP1, the channel interface 830 determines if the Q_Key is a designated Q_Key associated with QP1, e.g., 0x80010000. If the CM REQ message is directed to QP1 and the Q_Key is the designated Q_Key, then processing of the CM REQ message by the target host node 880 is permitted to continue. If the CM REQ message is directed to QP1, but the Q_Key is not the designated Q_Key associated with QP1, then a rejection response may be returned to the host node 810 that initiated the CM REQ message.

If the QP targeted by the CM REQ message was not QP1, then the channel interface 882 of the target host node 880 validates that the DETH of the CM REQ message has a Q_Key whose high order bit is set, which it would be set if the CM REQ message originated from a privileged mode only QP. If the Q_Key of the CM REQ message has the high order bit set, then processing of the CM REQ message by the target host node 880 is permitted to continue if the Q_Key in the CM REQ message matches the Q_Key of the destination QP. Otherwise, a rejection response message may be returned to the initiator host node 810 if either the Q_Key does not have the high order bit set or the Q_Key in the CM REQ message does not match the Q_Key of the destination QP.

Thus, the mechanisms described above, ensure that the CM REQ message is sent from a privileged consumer process and is not being sent by a user space process that may be spoofing. In addition to these protection mechanisms, the illustrative embodiments provide a mechanism by which the private data area of a CM REQ message may be processed to obtain the necessary TCP/IP connection establishment information, e.g., source IP address, destination IP address, and the like. In particular, a service identifier is provided that may be included in a DETH of a CM REQ message to indicate that the private data area is formatted according to a particular specification.

Normally, the private data area of an unreliable datagram, such as a CM REQ message, is not structured. As a result, processes may place any information they deem fit in the private data area in any fields of the private data area. Thus, if the private data area were used to convey TCP/IP information to a target host system 880, there is no way to know exactly where in the private data area the TCP/IP information is placed or what information is in which fields of the private data area. With the mechanisms of the illustrative embodiments, this private data area is structured in a predetermined manner such that certain fields of the private data area are designated for storing specific portions of the TCP/IP information. This structured private data area is specified in the header of the CM REQ message when it is utilized.

Based on the detection of this service identifier in the DETH of a received CM REQ message, a channel interface 882 of a target host node 880 may extract the necessary information from the private data area of the CM REQ message to establish a TCP/IP connection over a system area network. The service identifier may be any type of service identifier that may be included in the header, or DETH, of the CM REQ message.

The detection of the predetermined service identifier in the DETH of the received CM REQ message informs the channel interface 882 that the predetermined structure of the private data area is utilized in the CM REQ message. As a result, the channel interface 882 knows which fields of the private data area contain which portions of the TCP/IP information needed to establish a TCP/IP communication connection between the process 812 on host node 810 and processes on the target host node 880.

Figure 9:
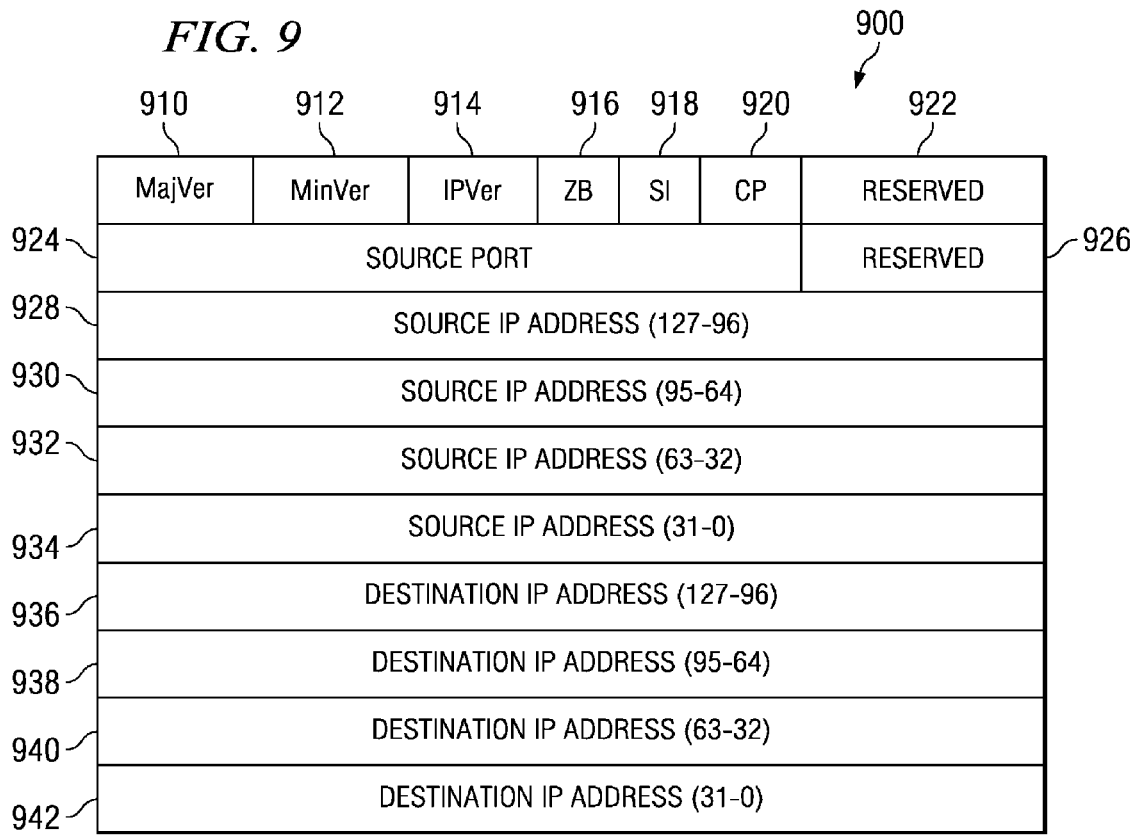
FIG. 9 is an exemplary block diagram illustrating a structured private data area of a CM REQ message in accordance with one illustrative embodiment.

FIG. 9 is an exemplary block diagram illustrating a structured private data area of a CM REQ message in accordance with one illustrative embodiment. FIG. 9 is only one possible structure for the private data area of the CM REQ message and is not intended to state or imply any limitation with regard to the manner by which the private data area may be structured. Many modifications to the structure depicted in FIG. 9 may be made without departing from the spirit and scope of the illustrative embodiments.

As shown in FIG. 9, the private data area 900 includes specific fields 910-942 for storing specific TCP/IP information that may be necessary for establishing a TCP/IP communication connection between processes of host nodes in a system area network, such as an InfiniBand™ network. In the depicted example, field 910 stores a major version, field 912 stores a minor version, field 914 stores an IP version, field 916 stores a zero-based virtual address (ZB) exception value, field 918 stores a send with invalidate (SI) exception value, field 920 stores a connection preference (CP) value, field 922 is reserved, field 924 stores a source port identifier, and field 926 is reserved. Fields 928-934 store the source IP address with each field storing a different portion of the source IP address, as depicted. Fields 936-942 store the destination IP address with each field storing a different portion of the destination IP address, as depicted.

A privileged consumer on an active side of the TCP/IP communication connection establishment, i.e. the source of the CM REQ message, is responsible for setting the values in the predefined private data fields 910-942, such as the source IP address, destination IP address, and the like. When the passive side, i.e. the target host node, receives the CM REQ message, it first validates that the CM REQ message came from a privileged consumer using the methodology and mechanisms described previously. Then, by examining the service identifier, the passive side knows that the private data area contains predefined fields, such as those shown in FIG. 9. The passive side may then interpret the private data area in accordance with the defined structure.

Figure 10:
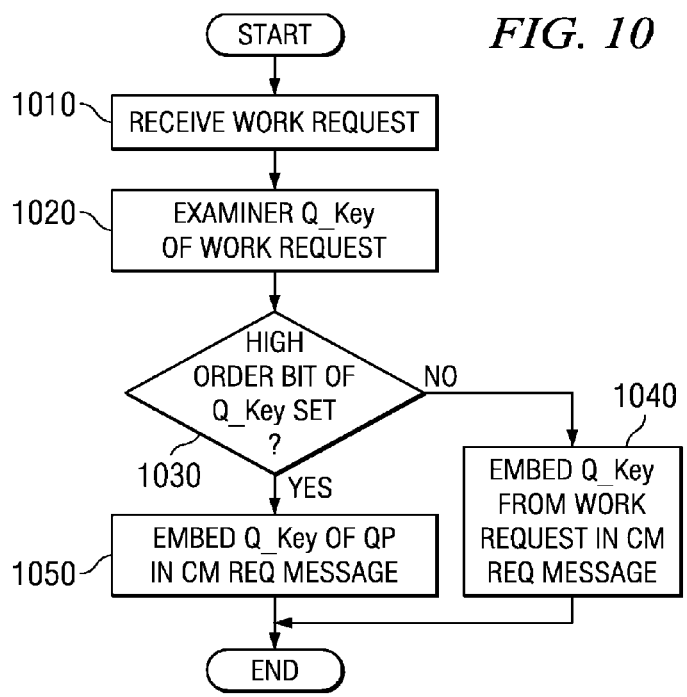
FIG. 10 is a flowchart outlining an exemplary operation of an active side of a connection establishment request in accordance with one illustrative embodiment.
Figure 11:
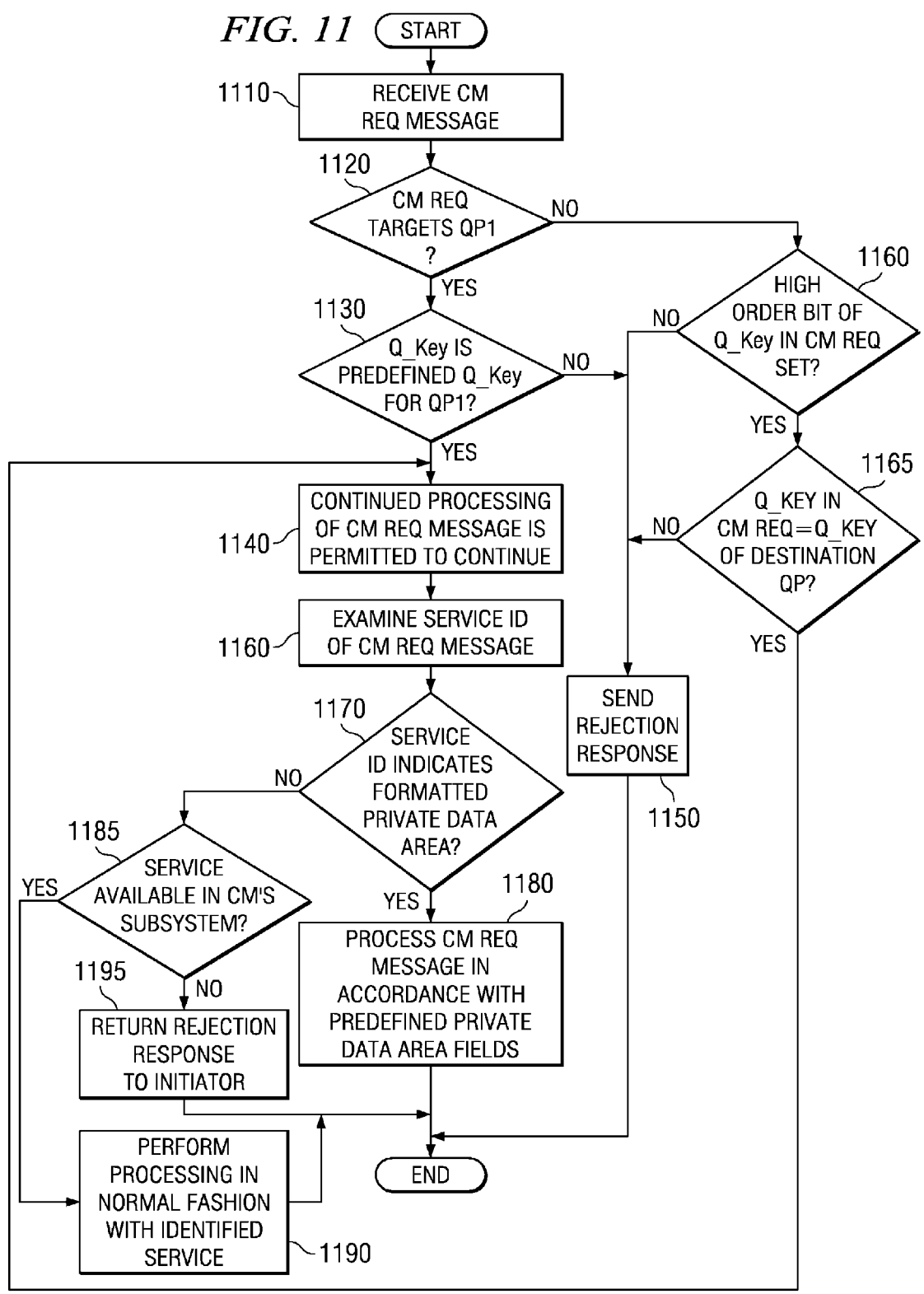
FIG. 11 is a flowchart outlining an exemplary operation of a passive side of a connection establishment request in accordance with one illustrative embodiment.

FIGS. 10 and 11 are flowcharts outlining exemplary operations of the active and passive sides of a communication connection establishment in accordance with one illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 10 is a flowchart outlining an exemplary operation of an active side of a connection establishment request in accordance with one illustrative embodiment. As shown in FIG. 10, the operation starts with the channel interface receiving a work request for establishing a TCP/IP communication connection (step 1010). The channel interface examines the Q_Key of the work request (step 1020) and determines if the high order bit of the Q_Key is set (step 1030). If the high order bit is not set, then the channel interface instructs the local queue pair to embed the Q_Key supplied in the work request in the CM REQ message that it sends out (step 1040). If the high order bit is set, then the channel interface instructs the local queue pair to embed a Q_Key associated with the local queue pair (step 1050). The operation then ends.

FIG. 11 is a flowchart outlining an exemplary operation of a passive side of a connection establishment request in accordance with one illustrative embodiment. As shown in FIG. 11, the operation starts with the receipt of a CM REQ message (step 1110). The channel interface determines if the CM REQ message targets queue pair 1 (step 1120). If so, the channel interface determines if the Q_Key of the CM REQ message is a predefined Q_Key associated with queue pair 1 (step 1130). If so, continued processing of the CM REQ message is performed so as to establish the TCP/IP connection (step 1140). For example, continued processing in accordance with the InfiniBand™ specification may be performed on the CM REQ message to thereby establish the TCP/IP connection. For example, upon receipt of a request from a remote channel adapter's connection manager (CM), the local channel adapter's CM determines whether the requested service is available on the local channel adapter (CA). If it is not, the CM sends a rejection message back to the remote CA's CM stating the reason for the rejection. If the requested service is supported by the local CA, the local CM creates a QP to handle its end of the communication channel, programs that QP's context with information supplied in the request, transitions the newly created QP to a ready-to-receive state, and then sends a response message back to the requester with information about the newly created QP.

Returning to step 1140, if the Q_Key of the CM REQ message is not the predefined Q_Key associated with queue pair 1, then a rejection response message may be returned to the initiator, or active side, of the CM REQ message (step 1150). If the CM REQ message is not directed to queue pair 1, the channel interface determines if the high order bit of the Q_Key in the CM REQ message is set (step 1160). If the high order bit of the Q_Key is set, then the channel interface compares the Q_Key in the CM REQ message with the Q_Key of the destination QP to determine if there is a match (step 1165). If there is a match, continued processing of the CM REQ message is performed (step 1140). If the high order bit of the Q_Key is not set, then a rejection response message may be returned to the initiator, or active side, of the CM REQ message (step 1150).

Thereafter, the channel interface examines the service identifier in the CM REQ message (step 1160) and determines if the service identifier specifies that predefined fields are used in the private data area of the CM REQ message (step 1170). If the service identifier in the CM REQ message indicates that predefined fields are utilized, the channel interface processes the information in the private data area in accordance with the predefined fields (step 1180). Otherwise, if the service identifier does not specify that predefined fields are utilized, then the CM determines if the desired service specified by the service ID exists within its associated subsystem (step 1185). If the service exists, then processing continues in a normal fashion as is generally known in the art (step 1190). Otherwise, if the service does not exist within the CM's associated subsystem, a rejection response message may be returned to the initiator, or active side, of the CM REQ message (step 1195). The operation then terminates.

Thus, with the mechanisms of the illustrative embodiments, a new service identifier is used to indicate that the CM REQ message private data area contains predefined fields according to a predefined structure. Furthermore, by restricting the CM REQ message to be sent by only privileged consumers, as verified by the controlled Q_Key, the passive side can ascertain that the information contained in the CM REQ message's private data area is not set by a non-privileged user space consumer. This guarantees that the handling of the predefined private data area fields of the CM REQ message is done by a privileged consumer and information, such as IP addresses, which are passed by the active side to the passive side in the CM REQ message private data area may be trusted.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for processing a communication connection request, comprising:
determining that a communication connection request has a first identifier indicating that the communication connection request originates with a privileged process;
if the communication connection request originates with a privileged process, determining that the communication connection request has a second identifier specifying that a private data area of the communication connection request utilizes predefined fields in a predefined format;
processing information in the private data area of the communication connection request in accordance with the predefined fields of the predefined format; and
establishing a communication connection using the processed information in the private data area of the communication connection request, wherein:
the communication connection request is a communication management request message having both a header in which the first and second identifiers are provided, and the private data area,
the second identifier is a service identifier in a communication management request message that specifies that the private data area stores Transmission Control Protocol (TCP)/Internet Protocol (IP) data in the predefined format, and the information in the private data area comprises a source IP address and a destination IP address for a communication connection in predefined fields of the private data area corresponding to the predefined formal the predefined fields being known to the data processing system in response to the data processing system processing the service identifier and recognizing the service identifier as specifying TCP/IP data being provided in the private data area in the predefined format.

2. The method of claim 1, wherein the first identifier is a Q_Key.

3. The method of claim 1, wherein the data processing system is a host node in a system area network, and wherein the method is implemented in a channel adapter of the host node.

4. The method of claim 1, wherein the information in the private data area further comprises at least one of a zero-based virtual address exception value, a send with invalidate exception value, a source port identifier, or a connection preference value, in predefined fields in accordance with the predefined format.

5. The method of claim 1, wherein the communication connection request comprises one or more unreliable datagram packets passed from another data processing system using a remote direct memory access (RDMA) operation.

6. The method of claim 1, wherein the first identifier is set to a first value if the communication connection request originates with a privileged process and is set to a second value if the communication connection request originates with a non-privileged process, and wherein only an operating system or a privileged process may set the first identifier to the first value.

7. The method of claim 1, wherein the determining steps, processing step, and establishing step are performed in a first host node of the data processing system, and wherein the method further comprises:
receiving, in a second host node of the data processing system, the communication connection request from a process running in a remote host node;
determining, in the second host node, whether the process is a privileged process;
modifying, in the second host node, the communication connection request to set the first identifier to a value corresponding to a value of the first identifier associated with a queue pair for the process if the process is not a privileged process; and
sending the communication connection request from the second host node to the first host node.

8. The method of claim 7, wherein if the first identifier is set to indicate that the communication connection request originates with a privileged process, then the first identifier is set to a value corresponding to a value of the first identifier provided in the communication connection request sent by the process and received in the second host node.

9. The method of claim 1, wherein determining if a communication connection request has a first identifier indicating that the communication connection request originates with a privileged process comprises:
determining if the communication connection request targets a queue pair associated with an operating system of the data processing system;
determining if the first identifier corresponds to the queue pair associated with the operating system; and
rejecting the communication connection request if the first identifier does not match an identifier for the queue pair associated with the operating system.

10. The method of claim 9, wherein determining if a communication connection request has a first identifier indicating that the communication connection request originates with a privileged process further comprises:
determining if the first identifier has a high order bit set if the communication connection request does not target a queue pair associated with the operating system;
determining if the first identifier matches an identifier of a queue pair targeted by the communication connection request, if the first identifier has a high order bit set; and
rejecting the communication connection request if either the first identifier does not have the high order bit set or the first identifier does not match an identifier of a queue pair targeted by the communication connection request.

11. The method of claim 1, wherein the information in the private data area further comprises a zero-based virtual address exception value, a send with invalidate exception value, a source port identifier, and a connection preference value, in predefined fields in accordance with the predefined format.

12. A computer program product comprising a non-transitory computer useable storage medium having a computer readable program stored thereon, wherein the computer readable program, when executed on a computing device, causes the computing device to:
determine that a communication connection request has a first identifier indicating that the communication connection request originates with a privileged process;
determine that the communication connection request has a second identifier specifying that a private data area of the communication connection request utilizes predefined fields in a predefined format, if the communication connection request originates with a privileged process;
process information in the private data area of the communication connection request in accordance with the predefined fields of the predefined format; and
establish a communication connection using the processed information in the private data area of the communication connection request, wherein:
the communication connection request is a communication management request message having both a header in which the first and second identifiers are provided, and the private data area,
the second identifier is a service identifier in a communication management request message that specifies that the private data area stores Transmission Control Protocol (TCP)/Internet Protocol (IP) data in the predefined format, and
the information in the private data area comprises a source IP address and a destination IP address for a communication connection in predefined fields of the private data area corresponding to the predefined format, the predefined fields being known to the data processing system in response to the data processing system processing the service identifier and recognizing the service identifier as specifying TCP/IP data being provided in the private data area in the predefined format.

13. The computer program product of claim 12, wherein the first identifier is a Q_Key, and wherein the second identifier is a service identifier.

14. The computer program product of claim 12, wherein the data processing system is a host node in a system area network, and wherein the method is implemented in a channel adapter of the host node.

15. The computer program product of claim 12, wherein the information in the private data area further comprises at least one of a zero-based virtual address exception value, a send with invalidate exception value, a source port identifier, or a connection preference value, in predefined fields in accordance with the predefined format.

16. The computer program product of claim 12, wherein the communication connection request comprises one or more unreliable datagram packets passed from another data processing system using a remote direct memory access (RDMA) operation.

17. The computer program product of claim 12, wherein the first identifier is set to a first value if the communication connection request originates with a privileged process and is set to a second value if the communication connection request originates with a non-privileged process, and wherein only an operating system or a privileged process may set the first identifier to the first value.

18. The computer program product of claim 12, wherein the information in the private data area further comprises a zero-based virtual address exception value, a send with invalidate exception value, a source port identifier, and a connection preference value, in predefined fields in accordance with the predefined format.

19. An apparatus, comprising:
a processor; and
a memory coupled to the processor, wherein the memory comprises instructions for executing a channel interface, and wherein the channel interface:
determines that a communication connection request has a first identifier indicating that the communication connection request originates with a privileged process;
determines that the communication connection request has a second identifier specifying that a private data area of the communication connection request utilizes predefined fields in a predefined format, if the communication connection request originates with a privileged process;
processes information in the private data area of the communication connection request in accordance with the predefined fields of the predefined format; and
establishes a communication connection using the processed information in the private data area of the communication connection request~wherein:
the communication connection request is a communication management request message having both a header in which the first and second identifiers are provided, and the private data area,
the second identifier is a service identifier in a communication management request message that specifies that the private data area stores Transmission Control Protocol (TCP)/Internet Protocol (IP) data in the predefined format, and
the information in the private data area comprises a source IP address and a destination IP address for a communication connection in predefined fields of the private data area corresponding to the predefined format, the predefined fields being known to the data processing system in response to the data processing system processing the service identifier and recognizing the service identifier as specifying TCP/IP data being provided in the private data area in the predefined format.

20. The apparatus of claim 19, wherein the information in the private data area further comprises at least one of a zero-based virtual address exception value, a send with invalidate exception value, a source port identifier, or a connection preference value, in predefined fields in accordance with the predefined format.

* * * * *